UNITED STATES PATENT OFFICE.

JOHN R. YOUNG, JR., OF NORFOLK COUNTY, VIRGINIA.

FERTILIZER.

SPECIFICATION forming part of Letters Patent No. 278,384, dated May 29, 1883.

Application filed April 26, 1882. (No specimens.)

*To all whom it may concern:*

Be it known that I, JOHN R. YOUNG, Jr., residing in the county of Norfolk and State of Virginia, have invented a new and useful Improvement in Fertilizers, of which the following is a specification.

The primary object of my invention is to render night-soil free of its offensive odor and other objectionable features while retaining all its valuable fertilizing properties.

My compound consists of night-soil and dry fish-scrap treated with sulphuric acid.

In carrying out my invention I take the materials named in about the following proportions, to wit: one thousand pounds of night-soil, four hundred pounds of dry fish-scrap, and one hundred and seventy-five pounds of sulphuric acid, (66° test.) These materials are thoroughly mixed, and when the chemical action is complete the compound is evaporated to dryness by exposure to the atmosphere, or otherwise without injurious heat, and then pulverized. Fish-scrap of about twelve per cent. moisture contains the equivalent of about ten per cent. ammonia and about eighteen per cent. of phosphate of lime. Phosphate of lime contains about fifty-four per cent. lime and forty-six per cent. phosphoric acid. Treated with sulphuric acid, its lime unites therewith, forming sulphate of lime, leaving the phosphoric acid available.

The chemical action and changes resulting from the compounding with night-soil of dry fish-scrap and sulphuric acid in about the named proportions may be thus explained: The ammonia of the night-soil and fish is converted into a sulphate, thereby fixing it and preventing loss by volatilization. Sulphate of lime is formed, which aids in setting and drying the compound. The phosphoric acid given up by the lime is rendered soluble and available as plant-food. Sulphurous-acid gas, or sulphur dioxide, is liberated, which acts as a deodorizer and disinfectant.

The compound resulting from the combination and chemical action described is an ammoniated superphosphate containing the combined valuable properties of night-soil and fish in the most available condition for plant-food. The dry fish-scrap aids materially in reducing the moisture of the compound. After the compound is thoroughly decomposed, evaporated to dryness, and pulverized it is ready for bagging.

My invention possesses the important advantage of depriving night-soil of its offensive odor with other objectionable properties, and rendering it fine and dry, so that it can be sown by machinery or from the hand without offense to the person, these results being accomplished by the addition of only such articles as add to its value as a fertilizer, while it retains all its own valuable properties.

Having thus described my invention, the following is what I claim as new therein and desire to secure by Letters Patent:

The fertilizer compound herein described, produced by the combination of night-soil, dry fish-scrap, and sulphuric acid, in about the proportions named, mixed and dried.

J. R. YOUNG, JR.

Witnesses:
 OCTAVIUS KNIGHT,
 H. E. KNIGHT.